(No Model.)

B. R. STERE.
WIRE STRETCHER.

No. 535,633. Patented Mar. 12, 1895.

UNITED STATES PATENT OFFICE.

BENJAMIN R. STERE, OF FLEMING, PENNSYLVANIA.

WIRE-STRETCHER.

SPECIFICATION forming part of Letters Patent No. 535,633, dated March 12, 1895.

Application filed October 15, 1894. Serial No. 525,989. (No model.)

*To all whom it may concern:*

Be it known that I, BENJAMIN R. STERE, of Fleming, in the county of Centre and State of Pennsylvania, have invented certain new and useful Improvements in Wire-Stretchers; and I do hereby declare the following to be a full, clear, and exact description of the invention, such as will enable others skilled in the art to which it pertains to make and use it, reference being had to the accompanying drawings, which form part of this specification.

My invention relates to an improved wire stretcher; and the object of the same is to provide an improved device of the windlass type for stretching wire; and a further object of the same is to provide an improved device for holding the stretcher proper to the post or other object.

The invention consists in the novel features of construction hereinafter fully described and claimed, and illustrated in the accompanying drawings, in which—

Figure 1:
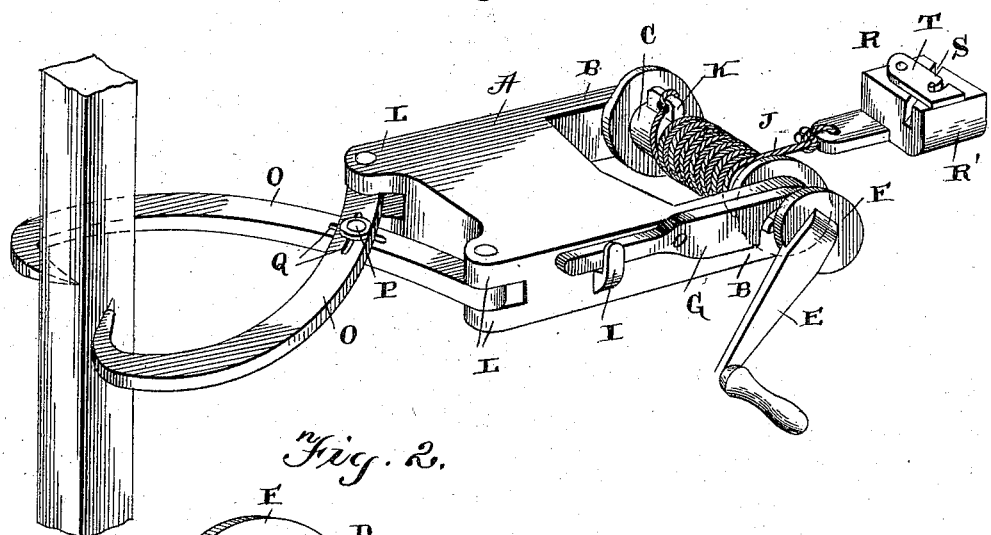
Figure 2:
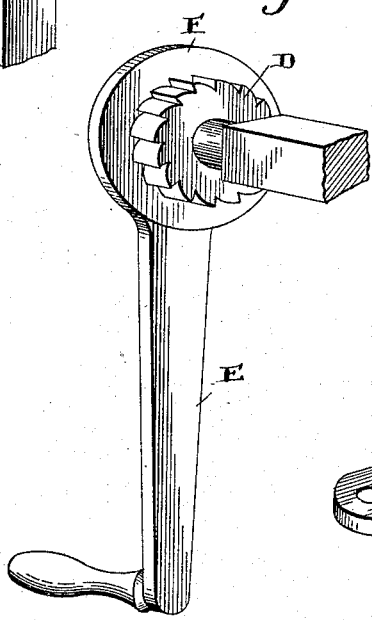
Figure 3:
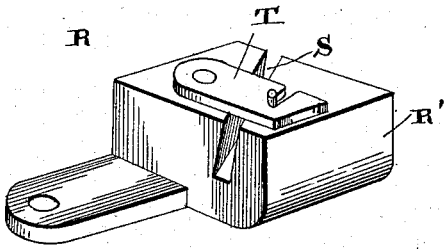

Figure 1 is a perspective view of the stretcher secured to a post in an operative position. Fig. 2 is a detail view of the crank and ratchet. Fig. 3 is a similar view of the wire grip.

A designates the main frame of the machine which is preferably cast in one piece and formed with the forwardly projecting arms B between which the drum C is placed as shown, the axle of the drum projecting outward at one side and having secured thereto the ratchet D and crank arm E. This ratchet and crank arm are preferably made integral as shown, and formed upon the outer side of the ratchet is the annular shoulder F for holding the dog in proper position. Pivoted between its ends to one side of the frame is the dog G which at its outer end engages the ratchet as will be understood and thus holds the shaft in a fixed position and the winding line thereon from uncoiling. The rear or free end of the dog is held in place by the guide I. As will be noticed the forward portion of the dog is cut away upon its under side so as to permit it to extend over the ratchet and engage substantially the top of the latter.

The winding line J is secured to the drum at its inner end by means of the perforated projection K formed at one side thereof.

Upon the rear side of the frame and on opposite edges thereof are the perforated ears L between which are pivoted the ends of the crossed-hook arms O. A pivot P connects the arms and the latter are slotted at Q where the said connection is had to permit the arms to open and close as will be readily understood. The outer ends of the same are hooked to form a grapple for engaging a post or other anchor to which the stretcher may be secured.

The wire grip R which is secured to the free end of the line is formed with an enlarged head R' and the latter upon one side is formed with the diagonal slot or depression S and the wire is confined therein by the pivoted latch T which is adapted to swing thereover as shown. The wire confining slot is made diagonal with relation to the longitudinal center of the grip so a more secure hold may be had upon the wire as when the latter is stretched a bend or substantial kink will be formed therein which will be very effectual in preventing the wire from slipping in the grip.

Having thus fully described my invention, what I claim, and desire to secure by Letters Patent, is—

1. In an improved wire stretcher the combination of a frame, a winding mechanism, anchor engaging crossed-arms which are pivotally connected at their inner ends to the frame, the arms being slotted at their points of intersection, and a pivot extended through the slot, substantially as shown and described.

2. In a wire stretcher the combination of a frame, a winding mechanism, perforated ears projected from the rear edge of the frame, anchor engaging cross arms pivoted at their inner ends between the said ears, the arms being formed with slots at their point of intersection, and a pivot extended through the slot, substantially as shown and described.

In testimony whereof I affix my signature in presence of two witnesses.

BENJAMIN R. STERE.

Witnesses:
HENRY H. MONTGOMERY,
THOMAS STILE.